United States Patent
Giacomini et al.

(10) Patent No.: US 8,651,141 B2
(45) Date of Patent: Feb. 18, 2014

(54) ELECTROMAGNETIC VALVE AND RELATIVE ASSEMBLY METHOD

(75) Inventors: Francesco Giacomini, Brescia (IT); Marco Zecchini, Brescia (IT); Vito Basile, Crotone (IT); Antonio Paciolla, Bari (IT)

(73) Assignee: Camozzi S.p.A. Societa' Unipersonale, Brescia (IT)

( * ) Notice: Subject to any disclaimer, the term of this patent is extended or adjusted under 35 U.S.C. 154(b) by 1012 days.

(21) Appl. No.: 12/188,503

(22) Filed: Aug. 8, 2008

(65) Prior Publication Data

US 2009/0039302 A1 Feb. 12, 2009

(30) Foreign Application Priority Data

Aug. 8, 2007 (IT) .............................. BS2007A0120

(51) Int. Cl.
 F16K 11/065 (2006.01)
 F16K 11/044 (2006.01)
 F16K 31/06 (2006.01)
(52) U.S. Cl.
 USPC ............ 137/625.65; 137/625.25; 137/625.27; 137/625.67
(58) Field of Classification Search
 USPC .............. 137/625.26, 625.27, 625.65, 625.67
 See application file for complete search history.

(56) References Cited

U.S. PATENT DOCUMENTS

| 3,608,585 | A | | 9/1971 | Huntington |
| 3,731,684 | A | | 5/1973 | Spiegel |
| 4,102,526 | A | * | 7/1978 | Hargraves ................ 251/129.21 |
| 4,159,026 | A | * | 6/1979 | Williamson .............. 137/625.5 |
| 4,501,299 | A | * | 2/1985 | Klimowicz et al. ...... 137/625.65 |
| 5,135,027 | A | * | 8/1992 | Miki et al. ................ 137/596.17 |
| 5,374,029 | A | * | 12/1994 | Bailey ...................... 251/129.16 |
| 6,116,276 | A | * | 9/2000 | Grill ........................ 137/596.17 |
| 6,199,587 | B1 | * | 3/2001 | Shlomi et al. ............. 137/625.5 |
| 6,684,896 | B2 | * | 2/2004 | Weiss et al. ............... 137/15.18 |

FOREIGN PATENT DOCUMENTS

| DE | 19953477 | 5/2000 |
| FR | 1431108 | 3/1966 |
| FR | 2078035 | 11/1971 |
| GB | 749672 | 5/1956 |
| GB | 1179719 | 1/1970 |

* cited by examiner

Primary Examiner — John K Fristoe, Jr.
Assistant Examiner — Seth W MacKay-Smith
(74) Attorney, Agent, or Firm — Shoemaker and Mattare

(57) ABSTRACT

An electromagnetic valve comprising casing, a coil and a mobile nucleus, sliding axially across the entire extension of the coil, between two operative positions wherein there is an interface with a powering body and a discharging body. The configuration of the electromagnetic valve guarantees a precise guide of the mobile nucleus free from sticking and enables speed and precision in the assembly of the electromagnetic valve.

26 Claims, 17 Drawing Sheets

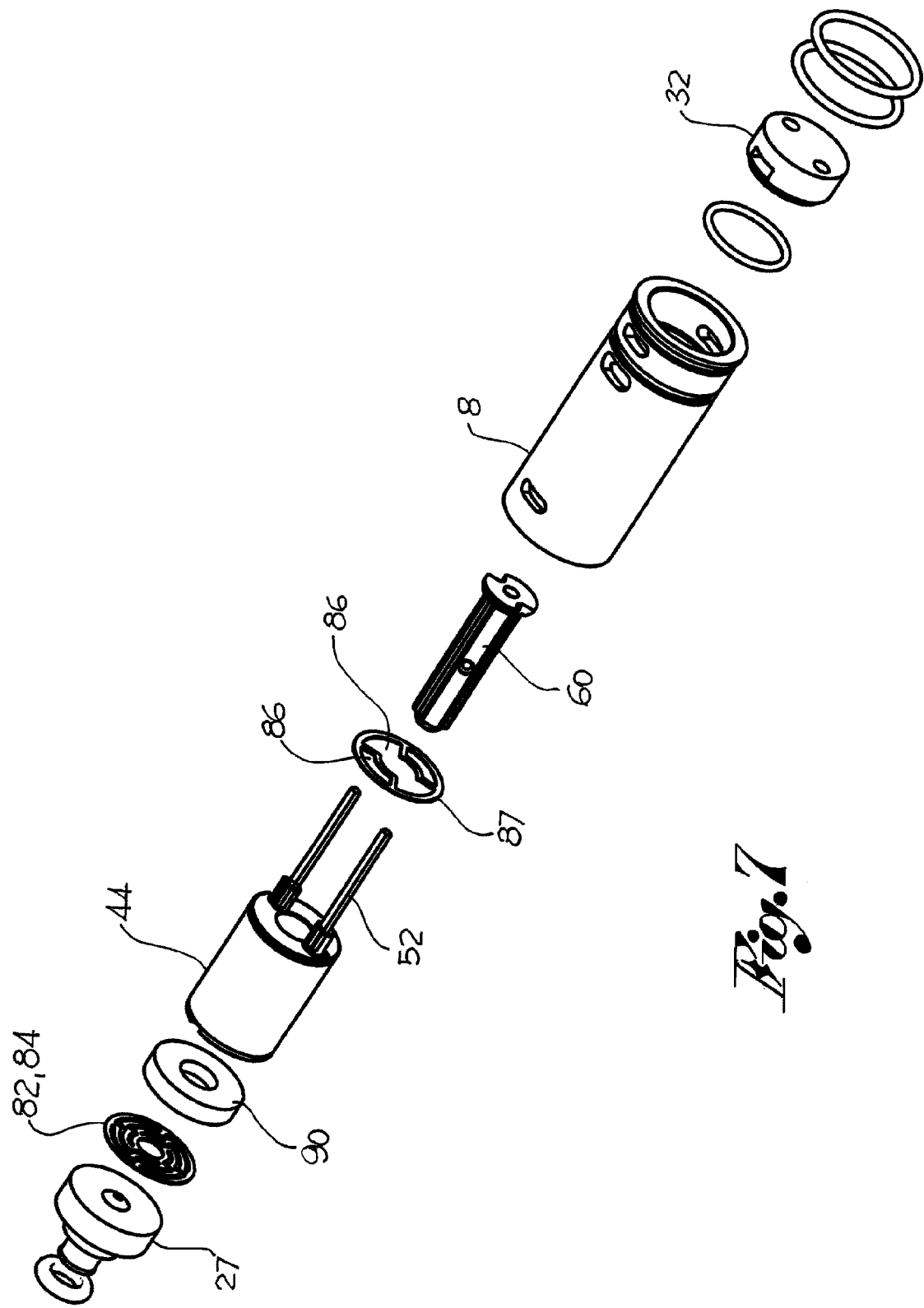

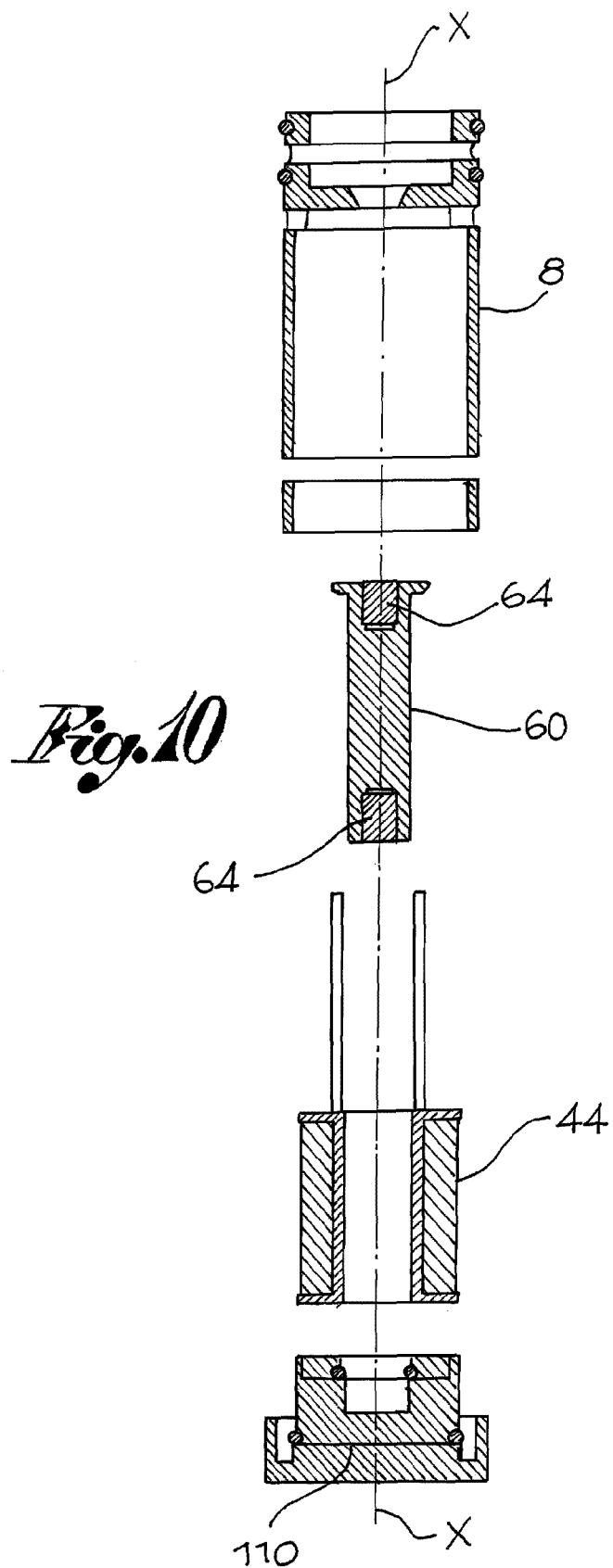

ELECTROMAGNETIC VALVE AND RELATIVE ASSEMBLY METHOD

FIELD OF THE INVENTION

The present invention concerns a electromagnetic valve, in particular a cartridge electromagnetic valve, and the relative assembly method.

BACKGROUND OF THE INVENTION

Various types of electromagnetic valves are available, usually comprising a casing, a coil, a fixed nucleus coaxial to the coil and a mobile nucleus subject to the action of the magnetic field generated by the coil; in particular, the mobile nucleus is influenced by an axial force of attraction exchanged with the fixed nucleus and moves between two separate working positions in which it interfaces with pneumatic connections, such as, for example, a powering position and a discharging position.

The solutions available present several disadvantages. For example, the mobile nucleus tends to stick inside the coil during its working stroke; moreover, the electromagnetic valves available are complex to assemble and the assembly operations do not always guarantee the necessary precision, with particular reference to the working stroke of the mobile nucleus.

SUMMARY OF THE INVENTION

The problem of the present invention is to create a electromagnetic valve which solves the problems mentioned with reference to currently used techniques.

These problems and restrictions are solved by a electromagnetic valve as described below.

As can be seen from the description below, the valve according to the invention makes it possible to overcome the problems of the currently used technique.

In particular, the flow lines of the magnetic field generated by the coil cross the nucleus axially, the polar expansion radially, then the casing in an axial direction and then a radial direction until they reach the shoulder in order to exercise an action of attraction on the plate of the mobile nucleus. Therefore, the flow lines are not subject to any interruption; in this way the dispersion of the field is limited as is the consumption of the valve.

Advantageously, the mobile nucleus crosses the whole coil in order to prevent the nucleus from sticking. Moreover, the force of friction between the mobile nucleus and the coil is constant and does not depend on the position of the nucleus inside the coil.

Advantageously, the grooves on the mobile nucleus link up the openings in the casing; moreover, the passage of air through the ribs favours the dispersion of the heat produced by the electric winding. Moreover, improved cooling of the nucleus prevents the risk of it sticking due to thermal dilatation for example.

The use of a flat spring guarantees the exercise of purely axial force, in order to perfectly guide the mobile nucleus, reducing friction inside the coil.

Thanks to the radial rigidity of the disc spring, the mobile nucleus guided by it is prevented from coming into contact with the polar expansion, creating points of contact between said two elements of the magnetic circuit which could cause gluing phenomena during the activation of the valve.

The spring, being made of ferromagnetic material, reduces the value of total reluctance of the magnetic circuit, directly linking the casing and mobile nucleus; in this way the flow lines can cross the spring and avoid running across the radial air gap between the polar expansion and the mobile nucleus. The guide means, such as the collar, being made of ferromagnetic material, also help reduce the total reluctance of the magnetic circuit.

The conical shape of the polar expansion creates a compartment in which the spring is free to deform and supply, together with the powering body, the necessary preload.

The electromagnetic valve according to the present invention also presents numerous advantages in terms of assembly.

In particular, the configuration of the valve with the mobile nucleus passing through makes it possible, at the end of the first manual assembly phase (with the assembly of the flat spring), to obtain a stable assembly, where the action of the spring, contrasted by the plate at the far end of the passing nucleus, prevents the nucleus from slipping out and guarantees the stability of the whole assembly.

Consequently there are further advantage, such as easy storage of goods in progress and the possibility to create, for example, a store, and therefore a production detachment between the first, entirely manual phase and the subsequent phases involving extensive automation. Therefore, the restriction of continuity in the production process and one-piece flow production cease to exist.

Moreover, the stability of the semi-assembly enables the performance of intermediate checks in order to identify non-conformant products even before assembly is complete (for example, assuming the rejection of the assemblies for which the stroke cannot be corrected by subsequent calibrated plantings).

The electromagnetic valves currently available require the planting of the valve body before carrying out the checks, carrying out all the tests at the end of the assembly process.

Moreover, the valves currently available are extremely unstable due to the action of the springs which tend to oust the nucleus and complicate the powering body planting phase, requiring the supervision and intervention of the operator.

The configuration of the valve according to the present inventions enables the clear separation in the assembly process between a first entirely annual phase and a subsequent extensively/totally automated phase (where the use of automation is determined by the criticality of the plantings due to the tolerances applied.

The clear separation of the two phases makes it possible to minimise the need for staff, reduce labour costs and, therefore, the cost of manufacturing the cartridge: the intervention of the operator in the phases characterised by extensive automation—e.g.: for the position of components—involves the supervision of dedicated staff or staff who operate in accordance with machine times.

The stability of the assembly constructed at the end of the first manual phase however enables quick and almost completely independent automation, in the subsequent assembly and automatic test phases.

The electromagnetic valve according to the present invention presents a limited number of components.

The configuration of the electromagnetic valve enables the control and correction of the nominal stroke according to the geometric and dynamic characteristics of the components through the automatic planting of the powering and discharging bodies.

A technician in the sector, in order to meet contingent and specific requirements, may make numerous changes and variations to the electromagnetic valves described above, all of which are contained within the context of the invention as defined by the following claims.

BRIEF DESCRIPTION OF THE DRAWINGS

Other embodiments of the electromagnetic valve according to the invention are described in the subsequent claims.

Further characteristics and advantages of the present invention shall become clearer in the description of preferable but non-restrictive embodiments, in which:

FIG. 4 represents a prospective view of pert IV of FIG. 3a;

FIG. 5 represents a prospective view of part V of FIG. 3a;

FIG. 7 represents a prospective view in separate parts of a electromagnetic valve in accordance with a further embodiment of the present invention;

FIGS. 10-17 represent sectioned views of subsequent phases of assembly of a electromagnetic valve in accordance with the present invention:

Figure 1:
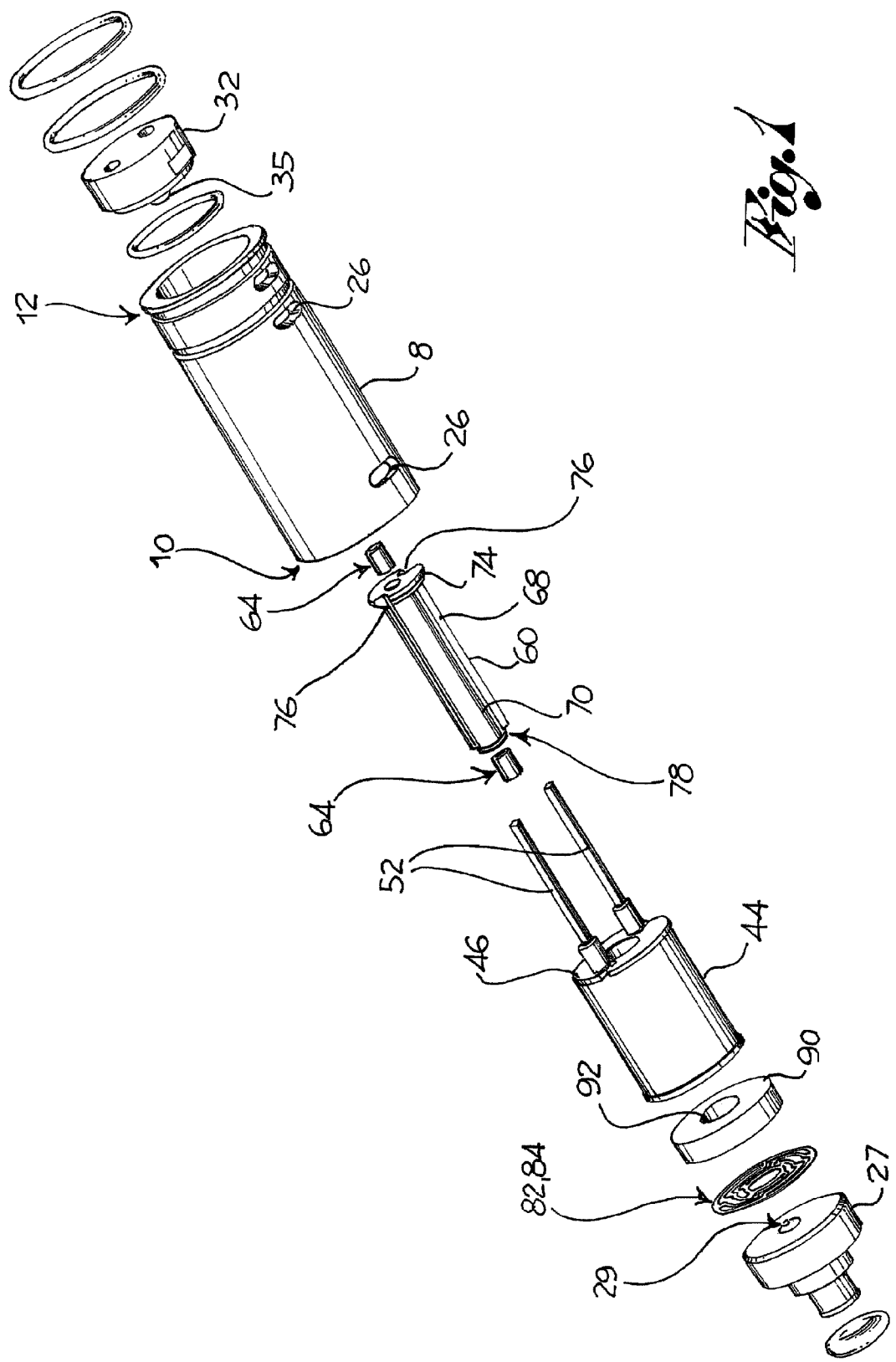
FIG. 1 represents a prospective view in separate parts of a electromagnetic valve in accordance with an embodiment of the present invention.
Figure 2:
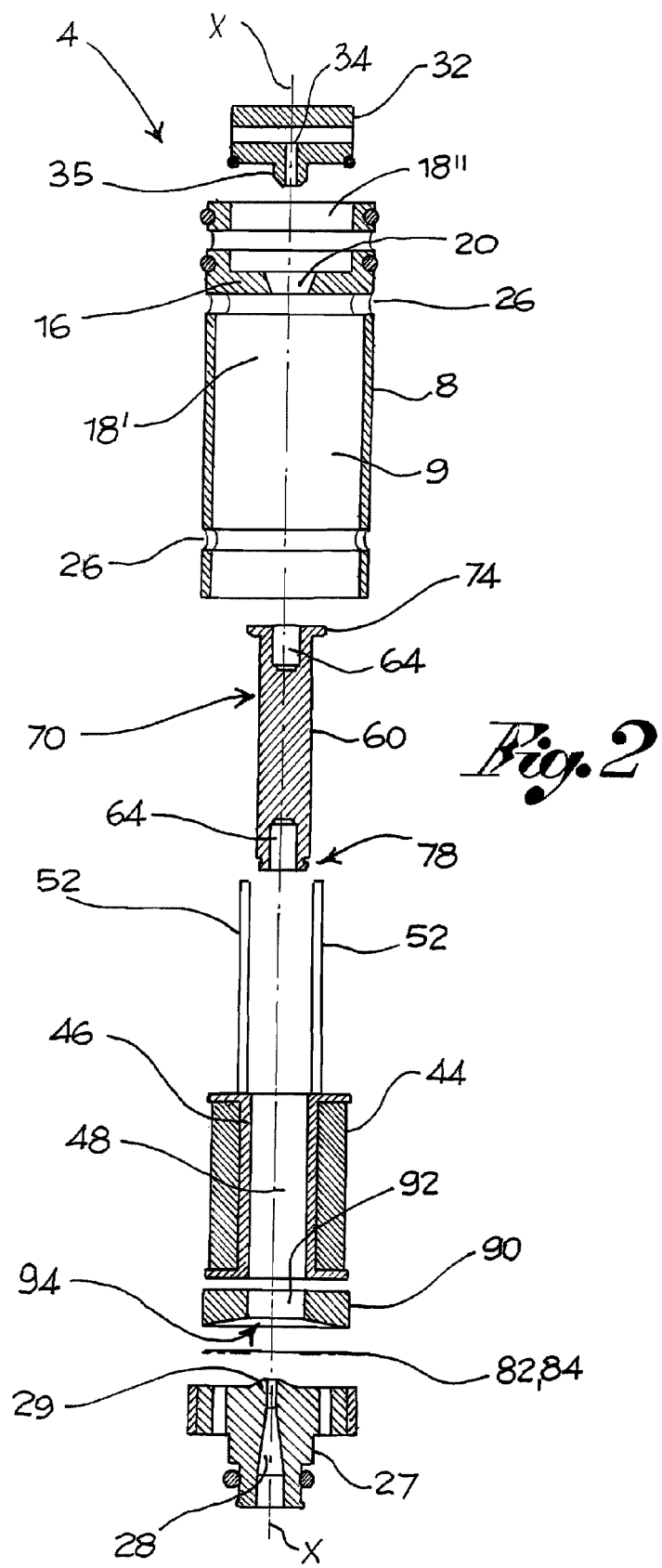
FIG. 2 represents a sectioned view in separate parts of the electromagnetic valve in FIG. 1.
Figure 3A:
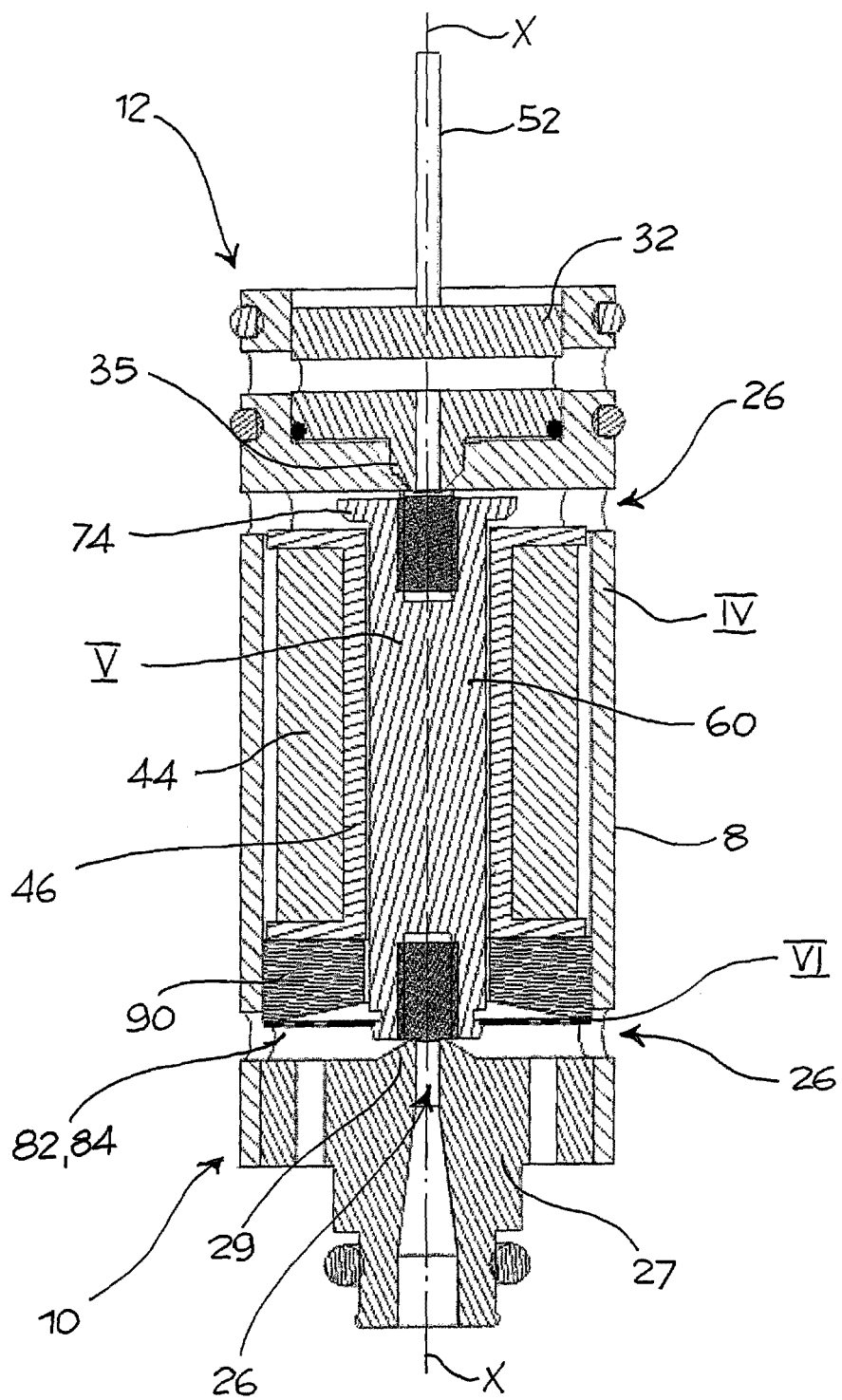
FIG. 3a represents a sectioned view in a configuration of assembly of the electromagnetic valve in FIG. 2.
Figure 3B:
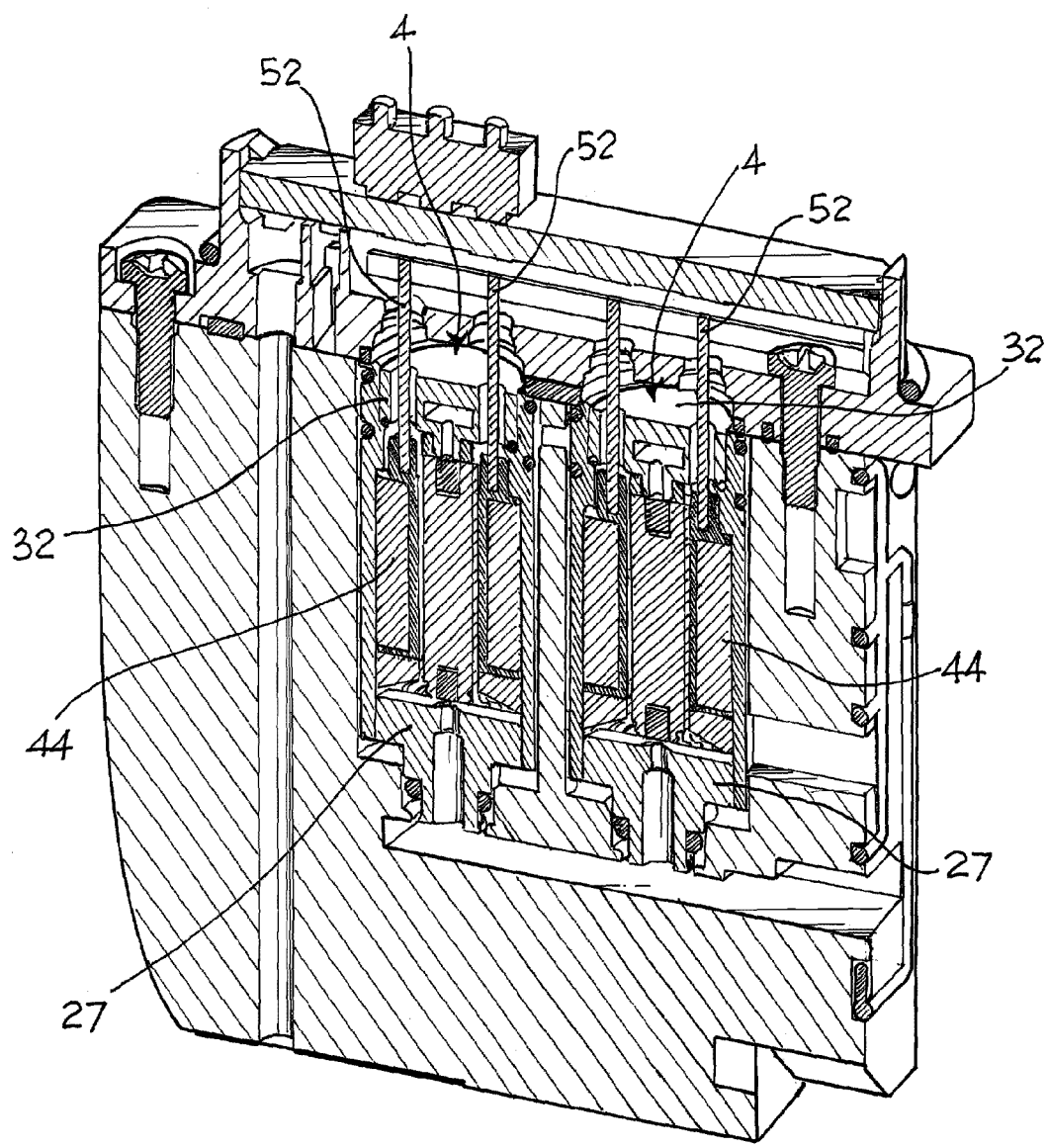
FIG. 3b represents a sectioned view of an example of assembly of electromagnetic valves in accordance with the present invention.

The elements or parts of elements in common between the embodiments described hereinafter shall be indicated with the same numeric references.

DETAILED DESCRIPTION OF THE INVENTION

With reference to said figures, 4 is used to globally indicate a electromagnetic valve.

The electromagnetic valve 4 comprises a casing 8, with a mainly X-X axial extension, suitable for building a supporting structure for the electromagnetic valve 4. For example, the casing 8 has a tubular structure which identifies a cavity 9 and extends from one powering end 10 to one discharging end 12; said ends 10,12 are preferably axially open. The term axial direction means a direction parallel to said mainly X-X extension.

The casing 8 comprises a shoulder 16 which reduces the passage section of the cavity 9; the shoulder 16 preferably divides the cavity into a first and second housing compartment 18',18" which communicate through a connection hole 20. The shoulder 16 preferably has a pair of electrical connection holes 22,23 passing through the shoulder 16 and arranged, according to one embodiment, in decentralised positions compared with the connection hole 20; the electrical connection holes 22,23 are preferably arranged in positions which are diametrically opposed to the connection hole 20.

Figure 4:
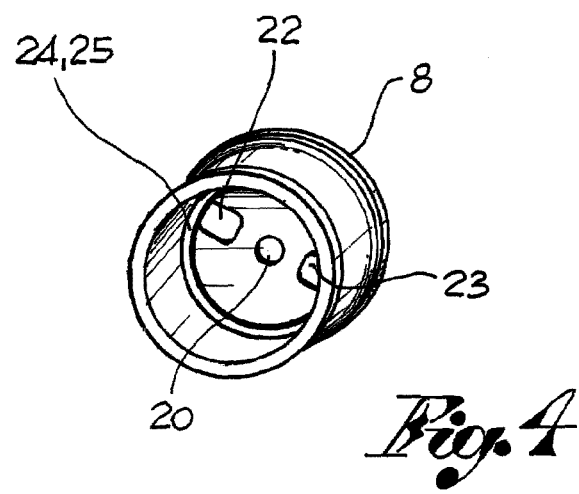
Figure 5:
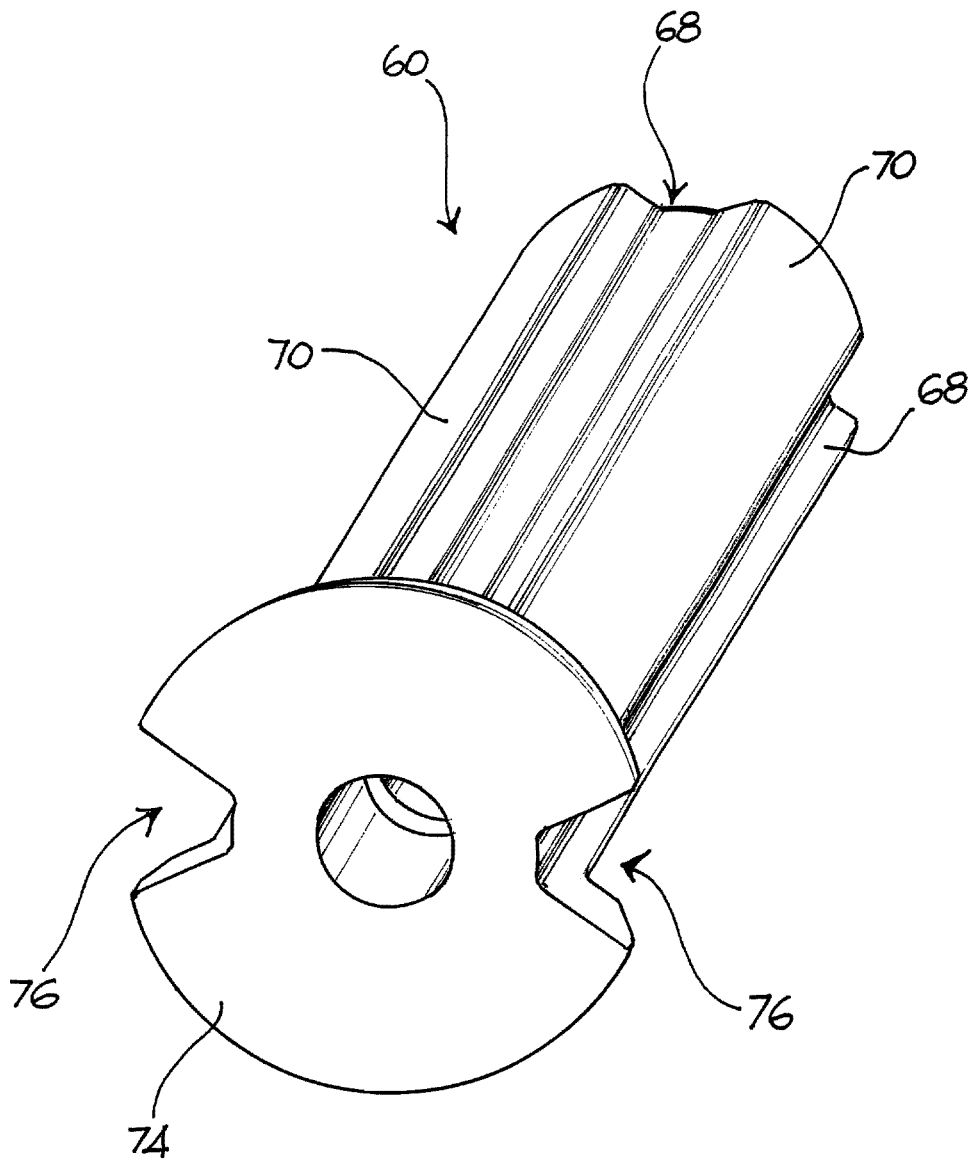
Figure 6:
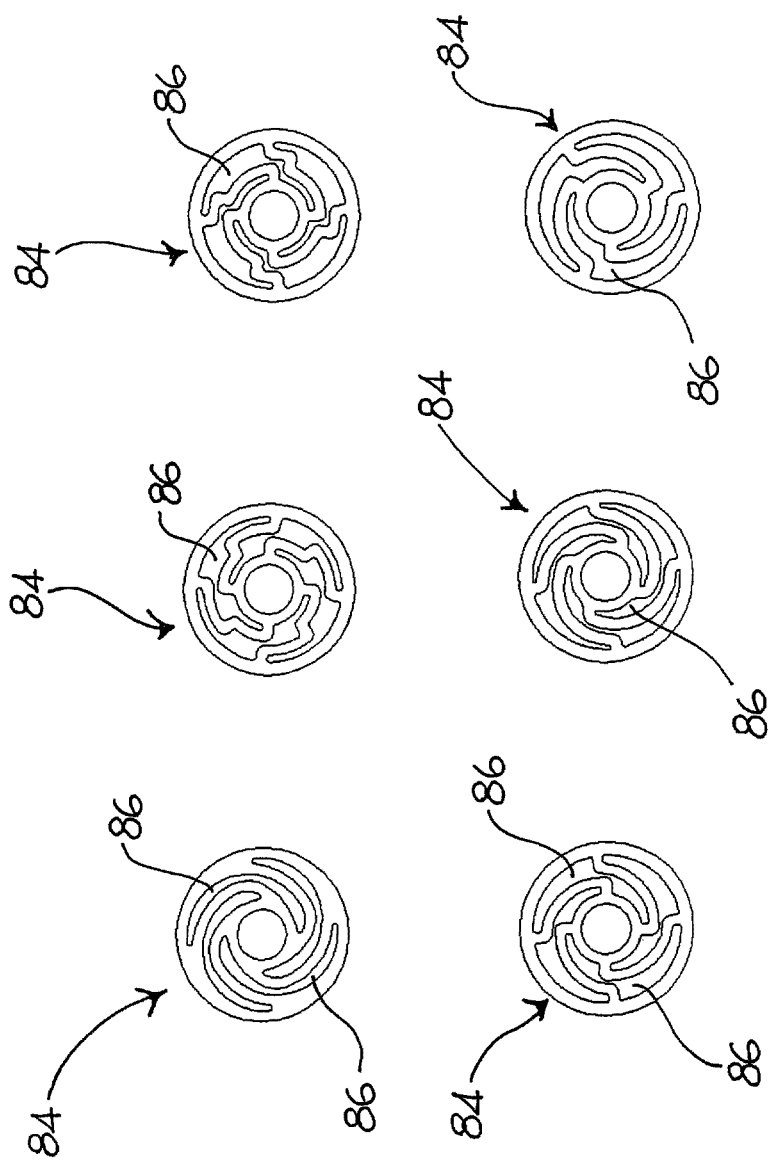
FIG. 6 represents a frontal view of part VI of FIG. 3a, according to possible variants of embodiment in accordance with the present invention.
Figure 9:
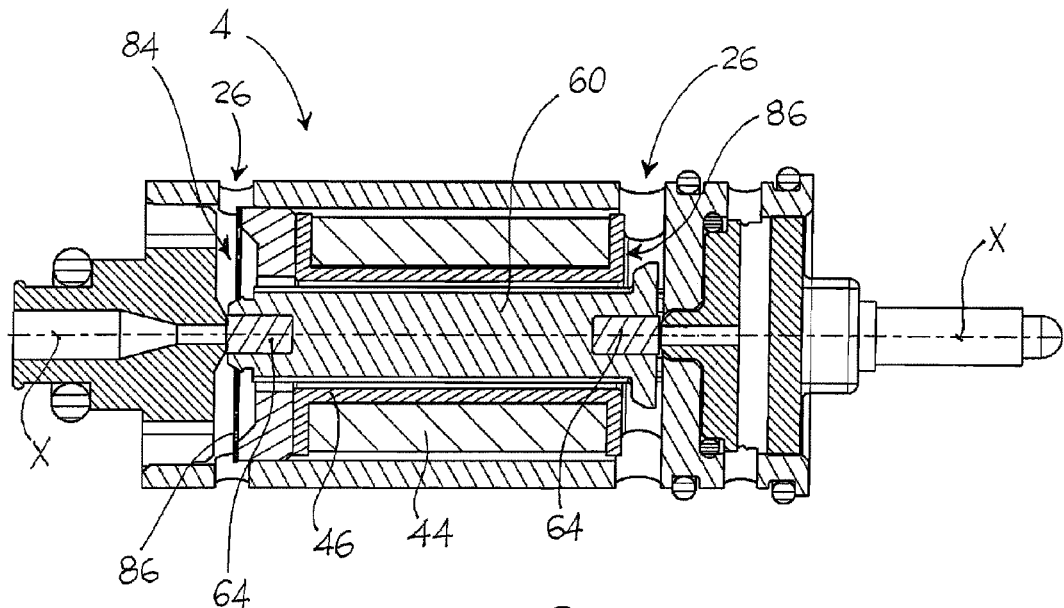
FIGS. 8 and 9 represent sectioned views in configuration of assembly of the electromagnetic valve in FIG. 7.
Figure 8:
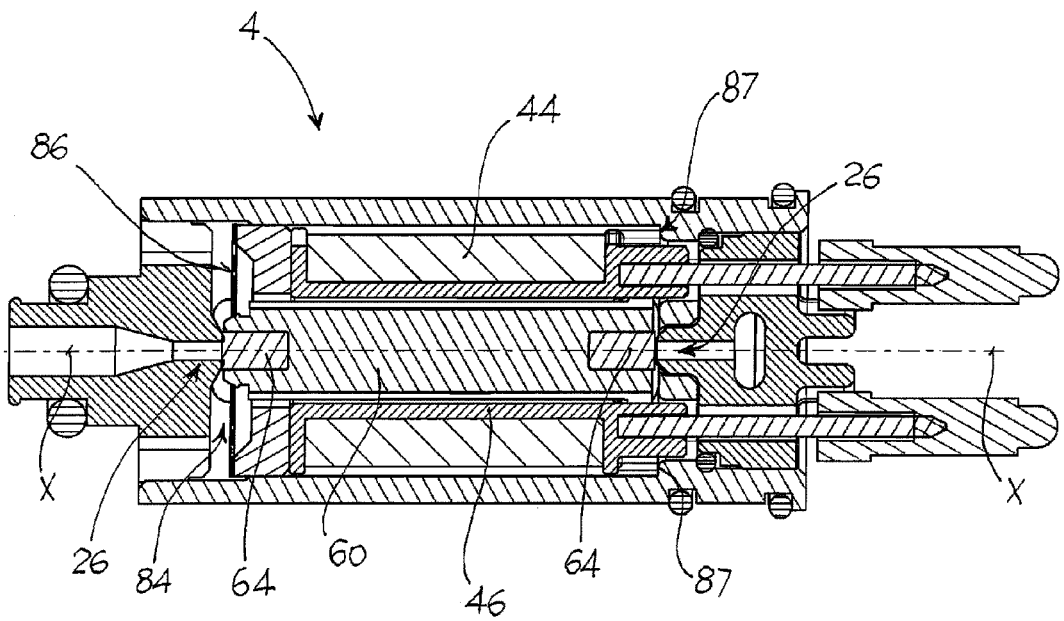

The casing 8, on the side of the shoulder 16, comprises means of contrast 24, such as a circular border 25 positioned inside the casing (FIG. 4).

Advantageously, the casing 8 is made of ferromagnetic material, thus forming an integrated part of the magnetic circuit of the electromagnetic valve.

According to a possible embodiment, the casing 8 comprises several pneumatic connections 26, for example, for pneumatic uses of the electromagnetic valve or to construct a powering and/or discharging body for the electromagnetic valve. Said pneumatic connections 26 can be, for example, in the form of openings in the lateral wall of the casing 8 so that pneumatic uses of the electromagnetic valve can be achieved.

According to one embodiment, said pneumatic connections 26 are suitable for creating a powering and discharging body for the electromagnetic valve 4.

For example, said pneumatic connections 26 comprise at least one powering hole 28 for the electromagnetic valve and/or one discharging hole 34 for the electromagnetic valve.

According to one embodiment, the electromagnetic valve 4 comprises a powering body provided with a powering hole 28 with relative powering nozzle 29, suitable for sending a flow of power to the electromagnetic valve 4.

For example, the powering body 27 is introduced into the cavity 9 of the casing and in particular in the first housing compartment 18', from the powering end 10; the powering body 27 is preferably coupled for interference inside the casing 8.

According to one embodiment, the electromagnetic valve 4 comprises a discharging body 32 provided with a discharging hole 34 with relative discharging nozzle 35. The discharging body 32 is preferably introduced into the cavity 9 of the casing 8 and in particular in the second housing compartment 18", from the discharging end 12; in particular, the discharging nozzle is introduced into the connection hole 20 of the shoulder; to guarantee the seal, an O-ring can be used between the discharging body 32 and the second housing compartment 18".

According to possible embodiments of the electromagnetic valve according to the invention, at least either said powering body 27 and/or discharging body 32 is one-piece with the casing 8.

The electromagnetic valve 4 comprises a coil 44 to generate a magnetic field, which has a central seat 48 coaxial to the same coil and to the X-X axial extension. The coil 44 comprises a reel 46, which has to support the electric winding, and electrical connections 52, of the 'pin' type for example, to power the same coil. The reel is preferably made of non-friction material.

Preferably following the introductions of the coil 44 into the casing 8, the electrical connections 52 pass through the electrical connection holes 22,23 of the shoulder 16 and come out of the discharging end 12 of the casing 8. After introduction into the casing 8, the coil 44 is placed with a radial gap in the first housing compartment 18' and brought to rest against the means of contrast 24,25 of the casing 8. The term radial gap means a gap compared with a direction perpendicular to the X-X axial extension and incident with the latter.

The electromagnetic valve 4 comprises a mobile nucleus 60, arranged coaxially to the coil 44, made of ferromagnetic material to be influenced by the magnetic field and mobile between two working position in which it interfaces with the powering hole 28 and the discharging hole 34 respectively.

Advantageously the mobile nucleus 60 passes through the whole axial extension of the coil 44 in order to selectively open and close the powering hole 28 and the discharging hole 34, sliding axially within the seat 48 of the coil 44.

In particular, the mobile nucleus 60 in correspondence with opposite axial ends directly facing the powering and discharging holes 28,34 preferably has a pair of rubber inserts 64, which guarantee the hermetic closure of said holes 28,34. It is possible to create axial seats on the ends of the mobile nucleus and introduce the rubber inserts 64 into them, or to envisage a co-moulding phase of the mobile nucleus 60 with the rubber inserts 84, perhaps following by the rectification of the contrast surfaces of the rubber inserts on the holes 28,34.

According to one embodiment, the mobile nucleus 60 is at least partially counter-shaped in comparison to the seat 48 of the coil 44 so that it is guided axially by the coil 44 in the translational movement thereof inside the seat, between a position in which it comes to rest against the powering nozzle 29 and a position in which it comes to rest against the discharging nozzle 35. Preferably, the mobile nucleus has a substantially cylindrical shape and is coupled, with a gap, inside the cylindrical seat 48.

Preferably, the mobile nucleus 60 is provided with at least one groove 68 on its lateral wall 70 directly facing the seat 48 in order to identify an opening between the coil 44 and the mobile nucleus 60 which forms a duct to allow the passage of air.

According to one embodiment, the groove 68 is substantially parallel to the X-X axial direction.

Preferably, the groove 68 extends along the lateral wall 70 of the mobile nucleus 60 in order to create fluidic communication between the powering end 10 and the discharging end 12; in particular the axial extension of said grooves 68 is preferably greater than or equal to the axial extension of the coil 44.

Preferably, the mobile nucleus 60 comprises a plurality of grooves 68 arranged angularly at a pitch according to an axialsymmetric configuration compared with the X-X axial direction, along the lateral wall 70.

Advantageously, the mobile nucleus 60 comprises a plate 74 suitable for exchanging a force of attraction with the shoulder 16 of the casing 8.

In particular, the plate 74, in one configuration of assembly, axially faces the shoulder 16 and is positioned externally compared with the seat 48, between the coil 44 and the shoulder 16, inside the first housing compartment 18'.

Therefore, the plate 74 is positioned in correspondence with an axial end of the mobile nucleus 60 directly facing the shoulder 16 of the casing 8 in order to exchange an axial force between the casing 8 and the nucleus 60.

The plate 74 has a radial size greater than the radial size of the seat 48 of the nucleus so that it cannot pass through the seat 48.

Moreover, the plate 74 has a radial size smaller than the first housing compartment 18' of the casing 8 so that it does not interfere radially with the casing and can slide freely inside it along the axial direction X-X.

Preferably, the plate 74 comprises at least one notch 76 to allow the passage of electrical connections 52 of the coil 44. Preferably the notches 76 are radially aligned with the electrical connection holes 22,23 in the casing 8.

The mobile nucleus 60 comprises a recess 78 to allow an axial block for elastic means 82 suitable of elastically influencing the stroke of the mobile nucleus 60.

Preferably, said recess 78 is set in a position axially opposite the plate 74.

The elastic means 82 comprise, for example, a disc spring 84 suitable of exercising a purely axial force on the mobile nucleus 60. Advantageously, the elastic means 82, and particularly the disc spring 84, is made of ferromagnetic material.

Advantageously, the disc spring 84 comprises a plurality of through openings 86, suitable for allowing the fluidic connection between the powering end 10 and the discharging end 12.

Preferably the disc spring 84 is radially restricted by a lateral wall inside the casing 8.

Advantageously, the elastic means 82, and particularly the spring 84, radially support the mobile nucleus 60 in order to restrict rubbing between the mobile nucleus 60 and the coil 44 as much as possible. In other words, the spring 84 also has to radially support the mobile nucleus 60 in order to guarantee the coaxial relationship with the coil 44 and prevent possible rubbing against the cavity of the coil 44. According to a further embodiment of the present invention, the electromagnetic valve comprises radial guide means, suitable of radially guiding the mobile nucleus 60 in order to guarantee the coaxial relationship between the mobile nucleus 60 and the coil 44.

For example, said guide means comprise a collar 87 suitable for being fitted over the mobile nucleus, preferably in a position axially opposed to the elastic means 82, and for radially restricting the mobile nucleus 60. In other words, the mobile nucleus 60 is radially guided in correspondence with its axially opposed ends.

According to a further embodiment, said guide means comprise a further spring, preferably of the disc type, suitable of exercising a radial guide action as well as an axial action on the mobile nucleus 60. Preferably, said further spring is provided with a lower preload than the disc spring 84 positioned at the opposite axial end of the mobile nucleus 60. Preferably, the guide means comprise openings 86 to allow the fluid link between the powering and discharging ends 10,12. For example, the guide means are fastened to the mobile nucleus according to a coupling of shape.

Preferably, the guide means are made of ferromagnetic material.

Advantageously, the electromagnetic valve 4 comprises a polar expansion 90 coaxial to the coil 44 and positioned in correspondence with one end of the coil 44, preferably facing the powering body 27.

The polar expansion 90 is made of ferromagnetic material in order to form a guide means for the dissemination of the magnetic field flow lines.

For example, the polar expansion 90 has a ring configuration and is counter-shaped compared with the lateral wall inside the casing. The polar expansion comprising an opening 92 to allow the passage of the opposite end of the mobile nucleus 60 compared with the plate 74. Advantageously, the diameter of the opening 92 of the polar expansion 90 is bigger than the diameter of the central seat 48 of the coil 44; this prevents the risk of possible contacts between the mobile nucleus 60 and the polar expansion 90 which could cause sticking.

In particular, the polar expansion 90 is directly in contact with the casing in order to guarantee continuity of the flow lines of the magnetic field between the mobile nucleus 80 and the casing 8.

Preferably, the polar expansion is slid with interference into the casing, in order to form an axial block for the coil 44 which, after the introduction of the polar expansion, is axially blocked between the polar expansion 90 and the means of contrast 24,25 of the casing 8.

Advantageously, the polar expansion 90 is positioned axially between the coil 44 and the disc spring 84.

The polar expansion 90, on the opposite side to the coil 44, comprises a flaring 94, axially facing the spring 84 and suitable for creating a seat to contain said spring 84 in its axial deformation.

Advantageously, the disc spring 84 is fastened in contact with the polar expansion 90, for example in correspondence with the outer diameter of the spring and of the polar expansion, in order to create continuity for the flow lines from the nucleus to the casing.

As can be seen, the electromagnetic valve shown in the figures attached is a cartridge type electromagnetic valve and presents three ways and two positions. Obviously it is possible to envisage a different number of ways, or pneumatic connections, depending on the type of component to which the electromagnetic valve is applied. In other words, the number of ways, positions and pneumatic connections of the electromagnetic valve can be varied to suit the requirements and uses of the component.

The method used to assemble a valve according to the invention will now be described.

In particular, before assembling the various components of the valve 4, the rubber seal inserts 64 are fitted in the mobile nucleus 60 for example being planted with a press and subsequently adjusted; according to a possible alternative embodiment it is possible to co-mould the rubber inserts 64 directly in their position on the mobile nucleus 60. The term planting means forced insertion with interference.

Figure 11:
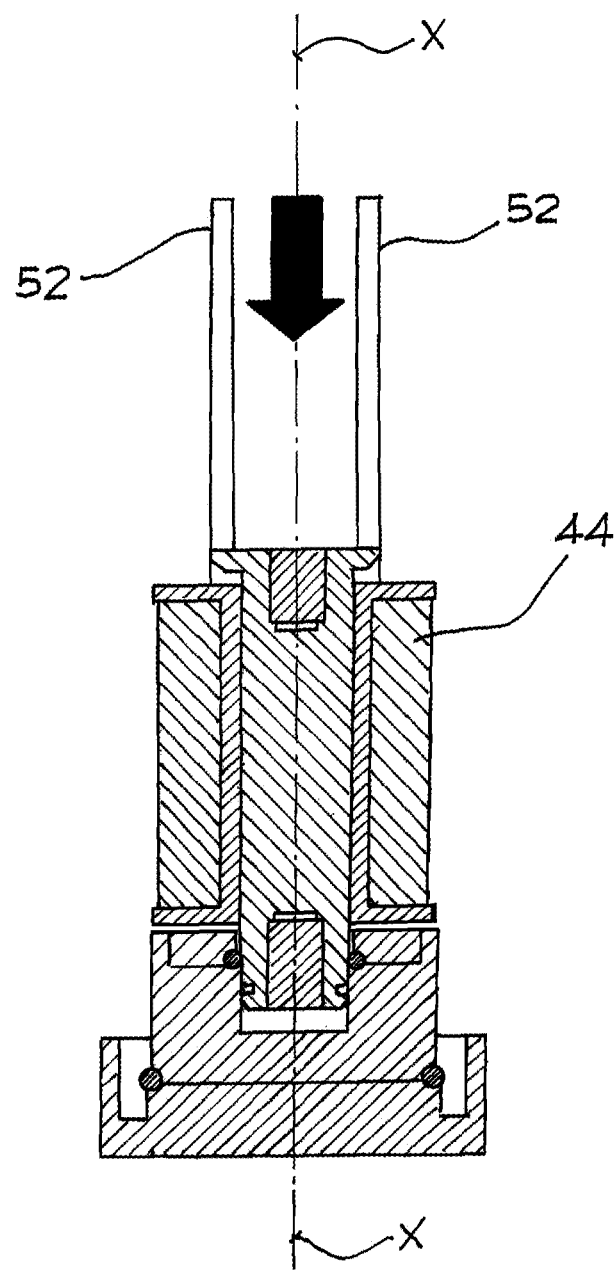
Figure 12:
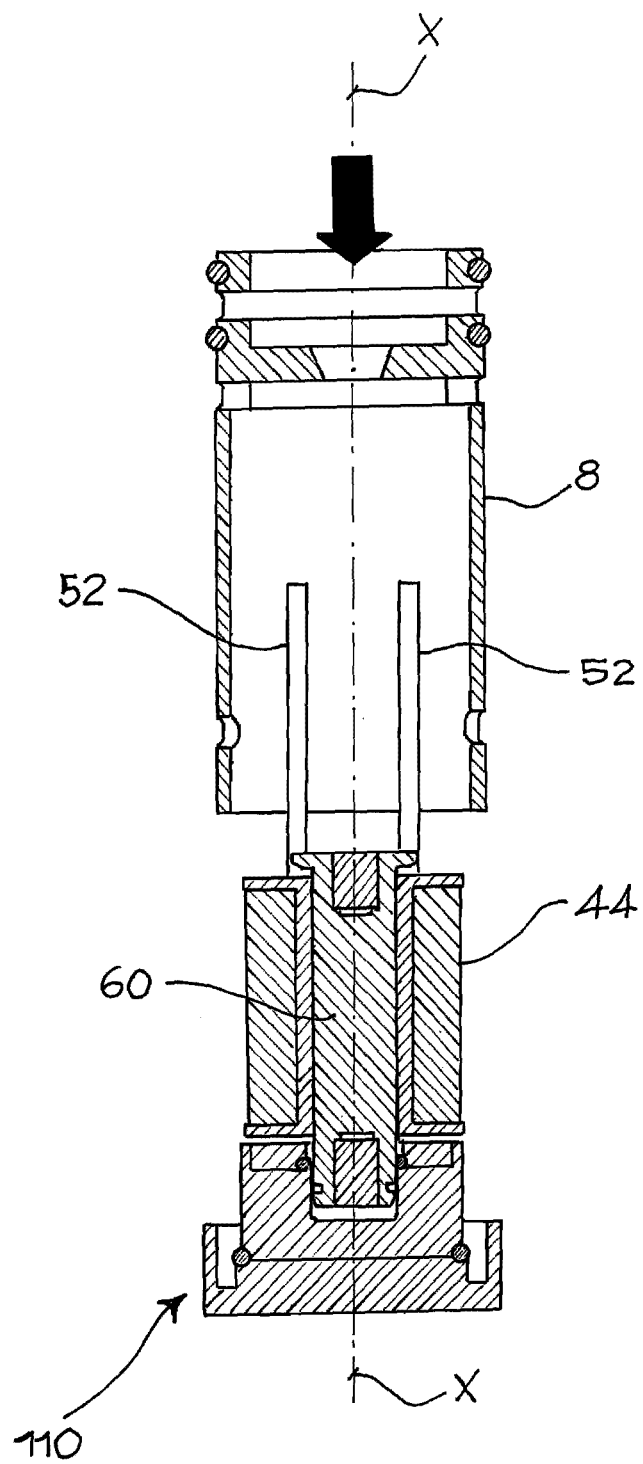
Figure 13:
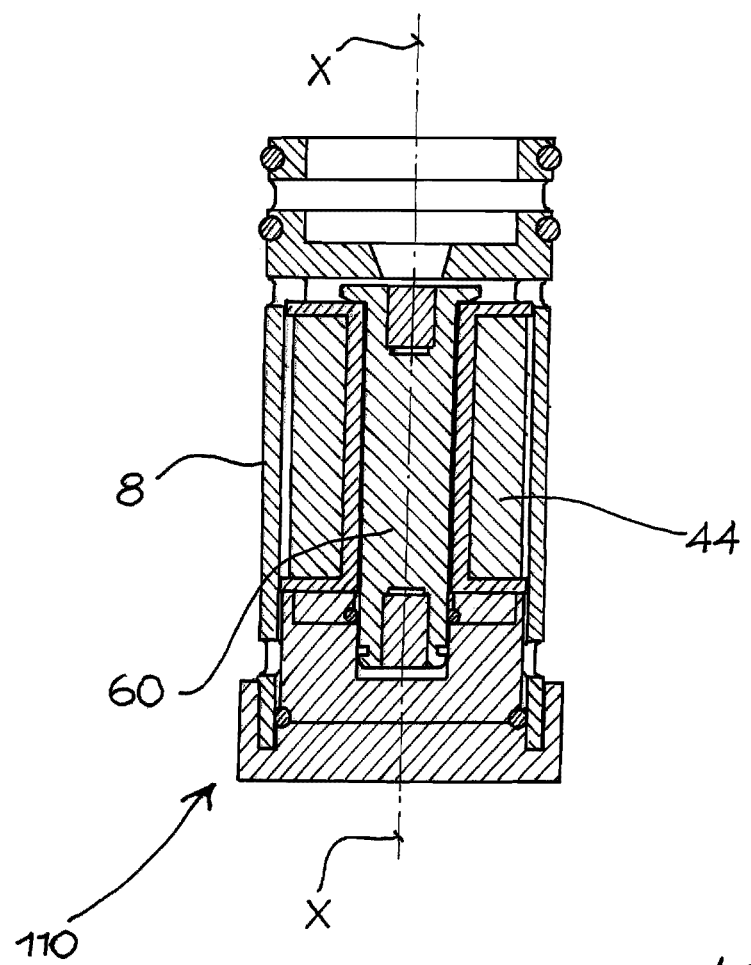

After axially aligning the casing 8, the coil 44 and the mobile nucleus 60 (FIG. 10), the mobile nucleus 60 must be introduced, manually for example. Into the coil (FIG. 11) and these components must then be introduced into the casing (FIGS. 12-13).

To facilitate these operations, a piece holder 110 can be used.

The procedure continues with the assembly of the polar expansion 90 into the casing 8 by planting with interference, preferably with an automatic press; in this way the pieces assembled so far are locked in place; in other words, the polar expansion 90 closes the components in a pack inside the casing 8, with the coil blocked axially between the polar expansion 90 and the means of contrast 24,25 of the casing 8.

Advantageously, the mobile nucleus 60 can slide inside the coil 44 but cannot come out of the semi-assembly, thanks to the fact that the plate 74 of the mobile nucleus 60 acts as a lock to prevent the extraction of the mobile nucleus 60 from the coil 44.

Figure 14:
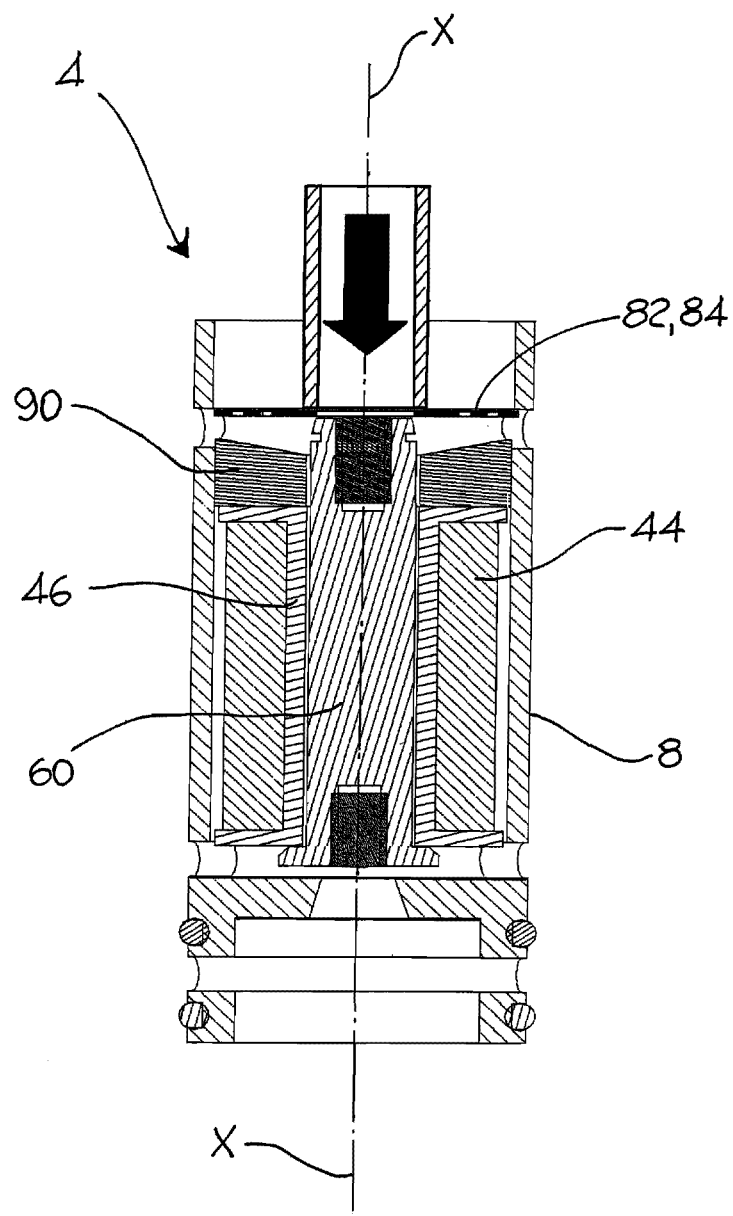

The flat spring 84 is then fitted to the mobile nucleus 60, preferably through planting with an automatic electric press (FIG. 14).

The shape of the end of the mobile nucleus 60 enables easy planting of the spring 84 elastically deforming it and locking it permanently in the recess 78 on the mobile nucleus 60.

Planting takes place with force control; in other words, when the spring 84 enters the recess 78 there will be a drop in force indicating the end of planting.

Figure 18:
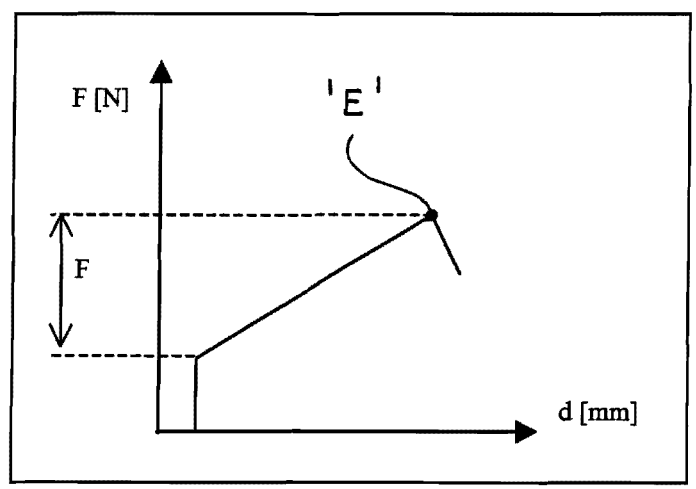
FIG. 18 represents a diagram relating to the progress of the planting force of a spring of the electromagnetic valve depending on the movement during the spring assembly phase.

For example, FIG. 18 shows the progress of the force of introduction of the press compared with the insertion stroke. The force undergoes a sudden change n gradient in correspondence with the introduction of the spring 84 into the appropriate recess 78, highlighted in FIG. 18 with the reference 'E'.

Figure 15:
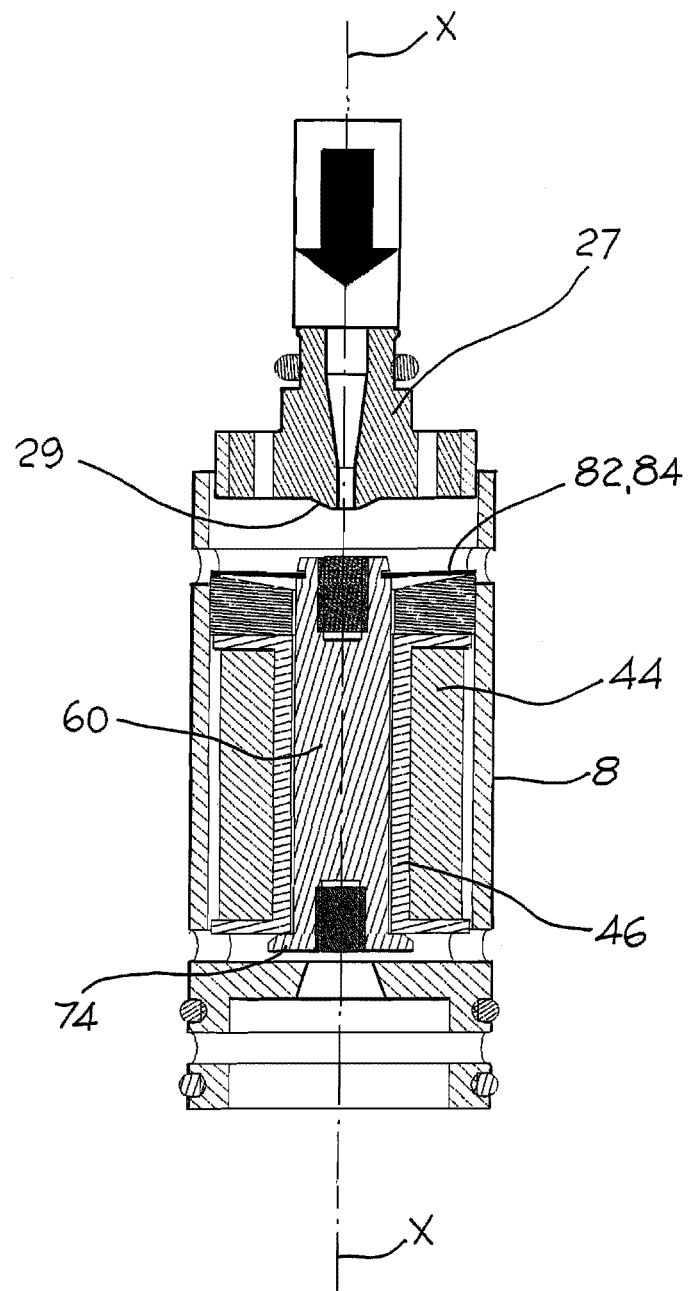

The powering body 27 is then assembled in the casing 8 through planting with an automatic press and calibration (FIG. 15).

A feeler pushes on the mobile nucleus 60 and takes the plate 74 of the mobile nucleus 60 to rest against the shoulder 16 of the casing 8 and, as it ascends, measures the stroke travelled.

The value of this stroke is transferred to a PC and relative software determines the planting stroke of the powering body 27 on the basis of the nominal stroke and the measurement of the height of the powering nozzle 29 positioned on the powering body 27.

The electric press plants the powering body 27 in the casing 8, checking that the movement made is equal to the measurement calculated.

Advantageously, with these operations it is possible to guarantee the preload of the spring 84, the stroke of the mobile nucleus 60 and therefore the pulling force and capacity values.

Figure 16:
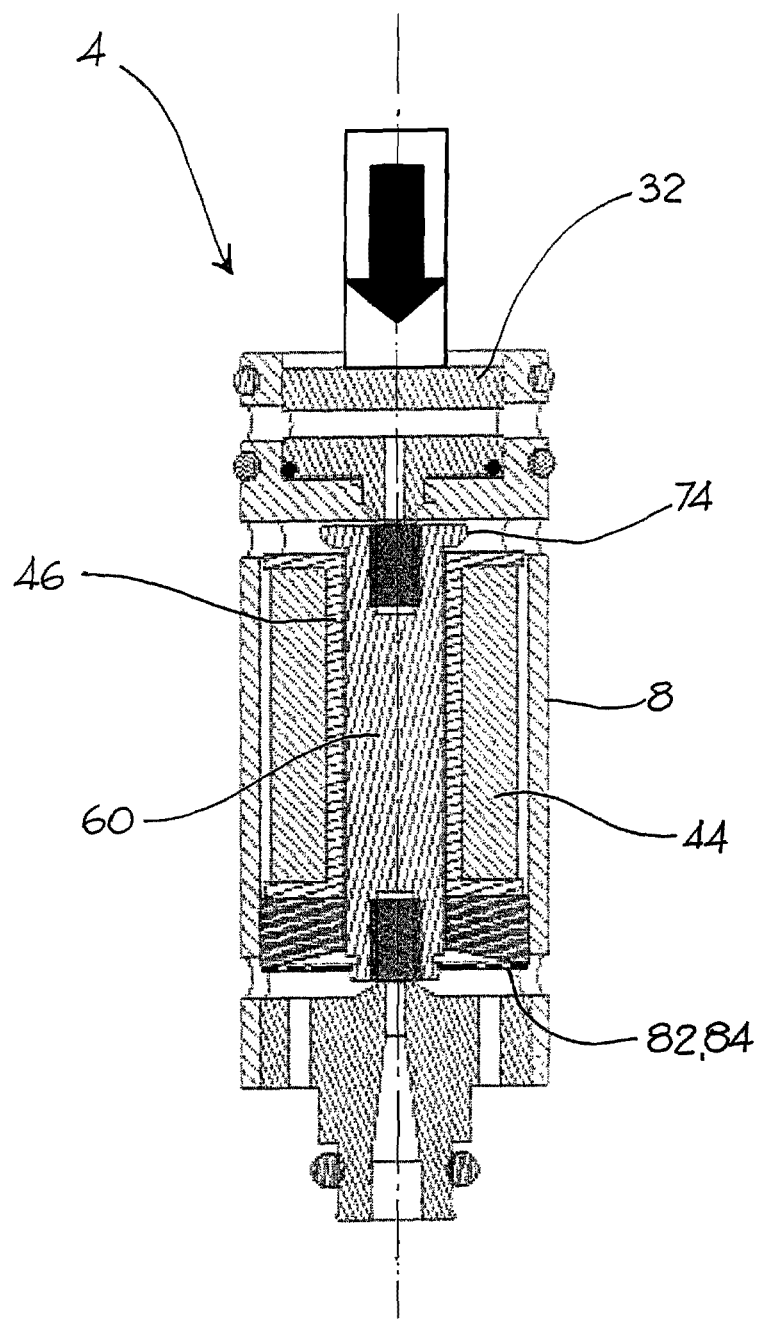

The discharging body 32 is then assembled (FIG. 16) onto the casing through planting with an automatic electric press.

In this case too, the discharging body 32 and its seat in the casing 8 must be measured in order to calculate the planting stroke.

The planting operation of the discharging body 32 can be carried out as a second calibration (or a fine tuning of the first calibration). Finally, it is possible to proceed with the application of resin to the electrical connections 52 (of the 'pin' type for example) and to the discharging body 32 in order to guarantee the pneumatic seal of the valve 4.

Figure 17:
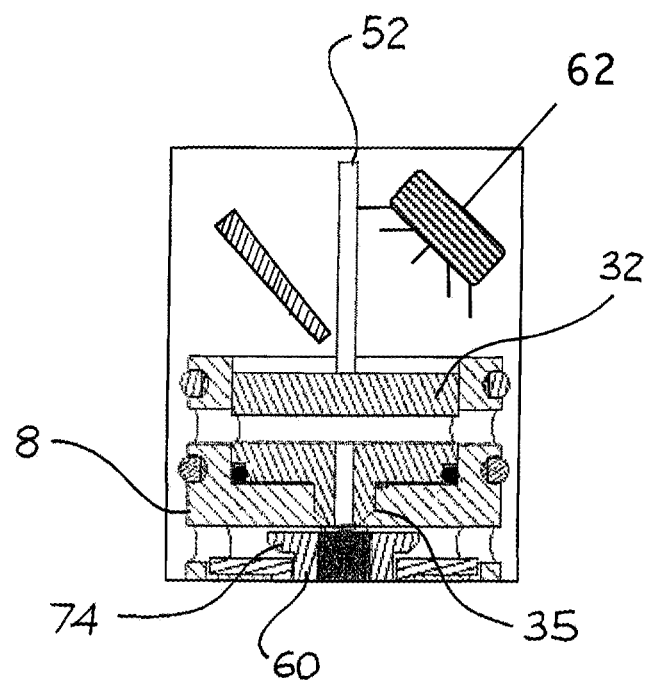

To speed up the polymerisation of the resin applied. UV-sensitive adhesive (not shown) and a special lamp 62 are used (FIG. 17).

Preferably, the assembly operations are followed by an electrical pneumatic test of the electromagnetic valve 4.

We claim:
1. Electromagnetic valve comprising
   a tubular casing, having a longitudinal axis, suitable for acting as support structure for the electromagnetic valve,
   said tubular casing including a first end and a second end, the first end housing a powering body provided with a powering hole, and the second end housing a discharging body provided with a discharging hole,
   at least one pair of pneumatic connections provided in a lateral wall of the tubular casing for obtaining the pneumatic uses of the electromagnetic valve,
   a coil to generate a magnetic field, said coil being placed in a housing compartment provided in the tubular casing between said first and second ends, said coil defining a central seat coaxial to the coil and to said longitudinal axis,
   a mobile nucleus, positioned coaxially to said coil, made of ferromagnetic material to be influenced by said magnetic field, and mobile between two working positions in which it interfaces with said powering and discharging holes, and
   elastic means suitable for elastically influencing the mobile nucleus in its working stroke,
   wherein the mobile nucleus extends the entire length of the coil in order to selectively open and close said powering and discharging holes, sliding axially within the seat of the coil,
   said tubular casing is made of ferromagnetic material in order to allow the closure of the flow lines of the magnetic field generated by the coil,
   said elastic means comprise a disc spring suitable for exercising a purely axial force on the mobile nucleus,
   the valve comprises a polar expansion member coaxial to the coil and positioned in correspondence with an axial end of the coil,
   the polar expansion member is in contact with the casing to maintain continuity of the magnetic field flow lines between the mobile nucleus and the casing, and
   the polar expansion member, opposite the coil, comprises a flaring suitable for creating a seat to contain said elastic means, and
   a first lateral pneumatic connection is provided at the interface between the powering body and the polar expansion member, a second lateral pneumatic connection is provided at the interface between the discharging body and the coil.

2. Electromagnetic valve according to claim 1, wherein at least one of said powering body and said discharging body is one-piece with said casing.

3. Electromagnetic valve according to claim 1, wherein the mobile nucleus is at least partially counter-shaped compared with the seat of the coil so that it can be guided axially by the coil in the translational movement thereof inside the seat.

4. Electromagnetic valve according to claim 1, wherein the mobile nucleus is provided with at least one groove on a lateral wall directly facing the seat in order to identify an opening between the coil and the mobile nucleus.

5. Electromagnetic valve according to claim 4, wherein said groove is substantially parallel to the axial direction.

6. Electromagnetic valve according to claim 4, wherein the mobile nucleus comprises a plurality of grooves arranged according to a configuration with at least one plane of symmetry parallel to said axial direction.

7. Electromagnetic valve according to claim 4, wherein the groove extends along a lateral wall of the mobile nucleus in order to create a fluidic connection between the powering end and the discharging end.

8. Electromagnetic valve according to claim 1, wherein the mobile nucleus comprises a plate suitable for exchanging a force of attraction with a relative shoulder of the casing.

9. Electromagnetic valve according to claim 8, wherein said plate is outside the central seat and has a radial size greater than that of the central seat.

10. Electromagnetic valve according to claim 8, wherein the plate is arranged in correspondence with one axial end of the mobile nucleus directly facing a shoulder of the casing in order to exchange an axial force between the casing and the mobile nucleus.

11. Electromagnetic valve according to claim 8, wherein the plate comprises at least one notch suitable for allowing the passage of electrical connections of the coil.

12. Electromagnetic valve according to claim 1, wherein the mobile nucleus in correspondence with opposite axial ends facing the powering and discharge holes comprises rubber inserts, suitable for guaranteeing the hermetic closure of said holes.

13. Electromagnetic valve according to claim 12, wherein the mobile nucleus comprises, in correspondence with said opposite axial ends, axial seats suitable for housing said rubber inserts.

14. Electromagnetic valve according to claim 12, wherein said rubber inserts are associated with the mobile nucleus through a co-moulding phase of the mobile nucleus with the rubber inserts.

15. Electromagnetic valve according to claim 1, wherein the mobile nucleus comprises a recess suitable for allowing an axial block for the elastic means.

16. Electromagnetic valve according to claim 15, wherein said recess is positioned on the opposite side to the plate.

17. Electromagnetic valve according to claim 1, wherein the spring is made of ferromagnetic material in order to contribute to guiding the magnetic field flow lines.

18. Electromagnetic valve according to claim 1, wherein the disc spring comprises a plurality of through openings, suitable for allowing the fluidic connection between the powering end and the discharging end.

19. Electromagnetic valve according to claim 1, wherein the spring is radially restricted by a lateral wall inside said casing, in order to radially support the mobile nucleus.

20. Electromagnetic valve according to claim 1, comprising radial guide means, suitable for radially guiding the mobile nucleus in order to guarantee the coaxial relationship between the mobile nucleus and the coil.

21. Electromagnetic valve according to claim 20, wherein said guide means comprise a collar suitable for being fitted over the mobile nucleus, said collar being placed in a position axially opposed to the elastic means.

22. Electromagnetic valve according to claim 20, wherein said guide means comprise a further disc spring suitable for exercising a radial guide action and an axial guide action on the mobile nucleus.

23. Electromagnetic valve according to claim 22, wherein said further disc spring is provided with a lower preload than the disc spring positioned on the opposite axial end of the mobile nucleus, on the side of the powering end.

24. Electromagnetic valve according to claim 20, wherein the guide means comprise through openings to allow the fluidic connection between the powering and discharging ends.

25. Electromagnetic valve according to claim 1, wherein the polar expansion comprises an opening suitable for allowing the passage of the end of the mobile nucleus opposite to the plate, the diameter of the opening of the polar expansion being bigger than the diameter of the central seat of the coil.

26. Electromagnetic valve according to claim 1, wherein the elastic means are restricted in contact with the polar expansion in order to create continuity for the flow lines from the mobile nucleus to the casing.

\* \* \* \* \*